United States Patent [19]
Kurtgis

[11] Patent Number: 5,417,304
[45] Date of Patent: May 23, 1995

[54] SUSPENDING LOADS FROM A HELICOPTER

[76] Inventor: Michael P. Kurtgis, 501 Solar Isle Dr., Fort Lauderdale, Fla. 33301

[21] Appl. No.: 62,786

[22] Filed: May 14, 1993

[30] Foreign Application Priority Data

May 15, 1992 [AU] Australia .............................. PL2484

[51] Int. Cl.$^6$ ............................................... A62B 1/06
[52] U.S. Cl. ........................................ 182/150; 182/7; 244/137.4
[58] Field of Search ................. 182/150, 145, 3, 7; 244/137.4, 118.1, 137.1

[56] References Cited

U.S. PATENT DOCUMENTS

| | | | |
|---|---|---|---|
| 2,953,330 | 9/1960 | Lysak | 244/118.1 |
| 3,081,121 | 3/1963 | Campbell | 244/137.1 X |
| 3,348,791 | 10/1967 | McKinlay | 244/137.1 X |
| 4,379,534 | 4/1983 | Miller | 244/137.4 |
| 4,477,289 | 10/1984 | Kurtgis . | |
| 4,478,312 | 10/1984 | Kurtgis . | |
| 4,637,575 | 1/1987 | Yenzer . | |
| 4,673,059 | 6/1987 | Kurtgis . | |
| 4,993,665 | 2/1991 | Sparling | 244/118.1 |

Primary Examiner—Alvin C. Chin-Shue
Attorney, Agent, or Firm—Renner, Kenner, Greive, Bobak, Taylor & Weber

[57] ABSTRACT

An arrangement and method for suspending a load from a rotary winged aircraft such as a helicopter by two releasable connections, wherein the load is adapted to be detached from the rotary winged aircraft upon both connections being released. Further safety features are also claimed.

12 Claims, 5 Drawing Sheets

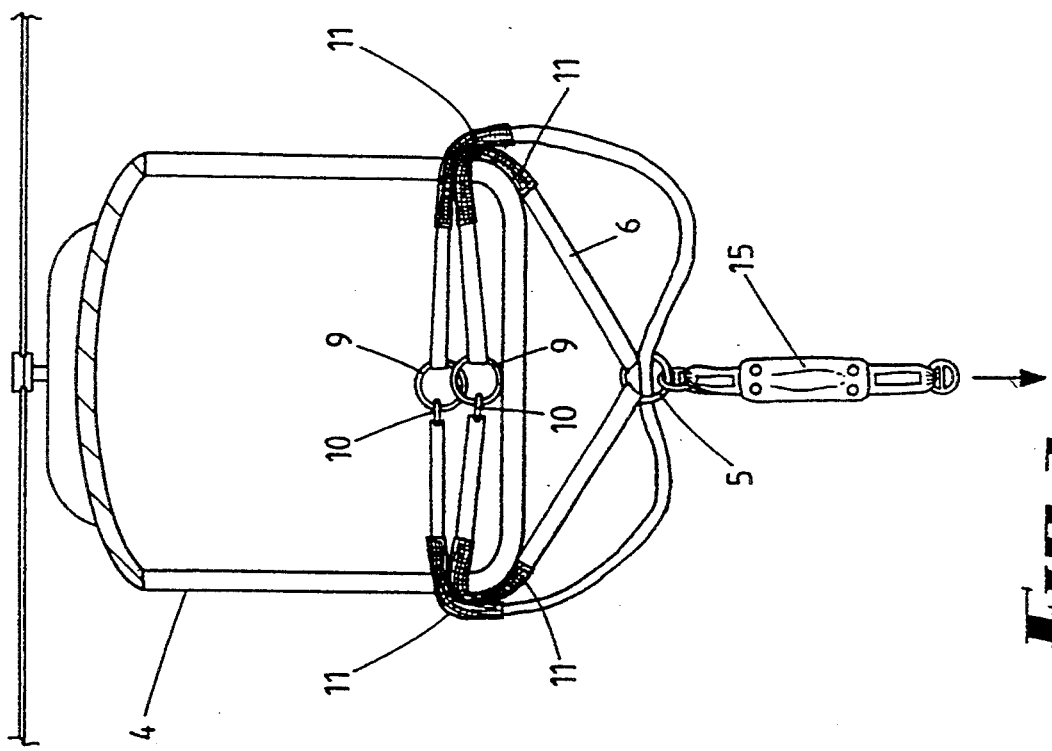
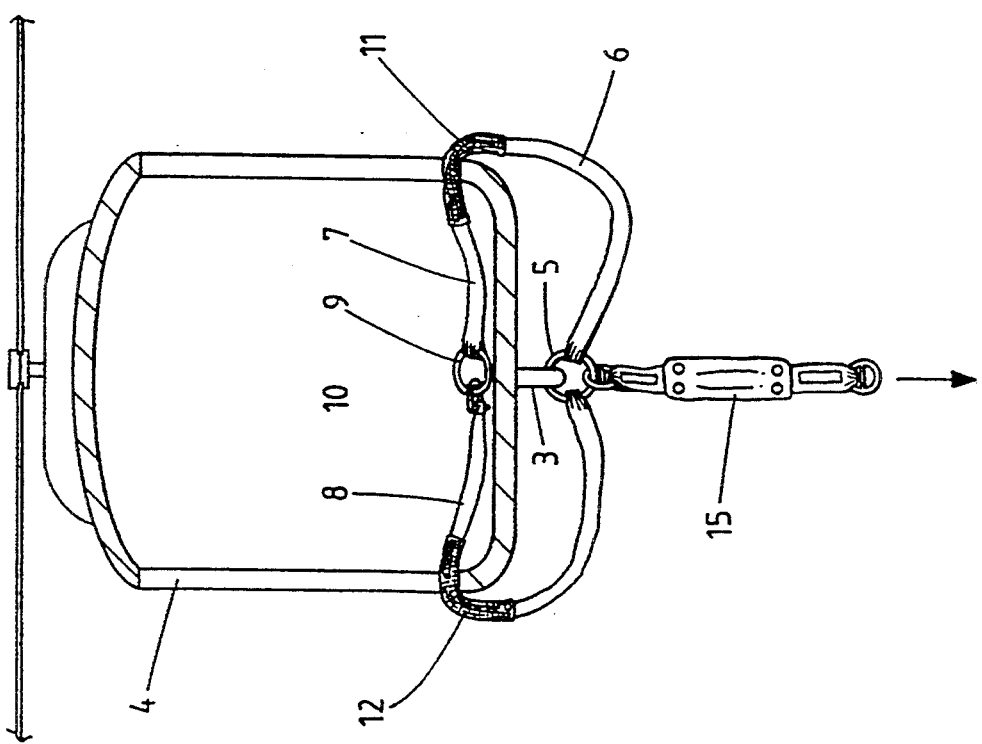

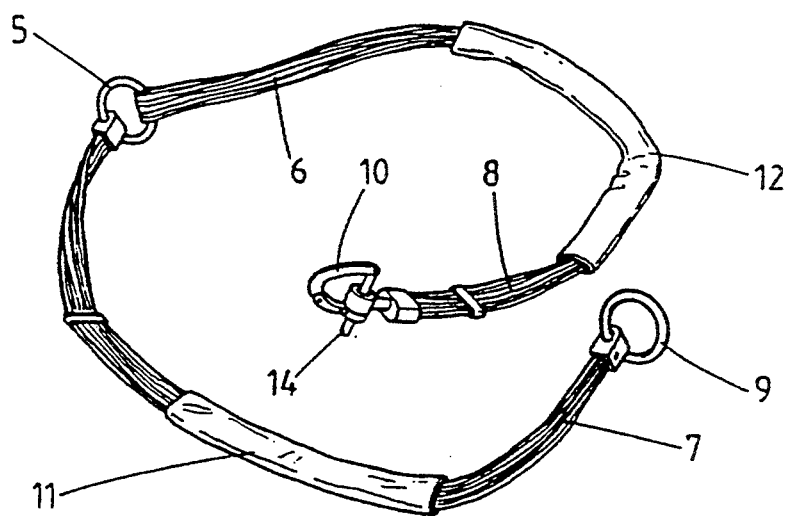
FIG 4
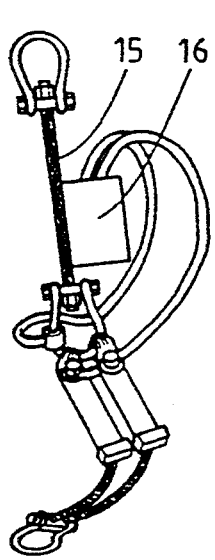
FIG 5
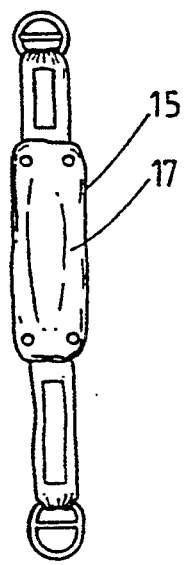
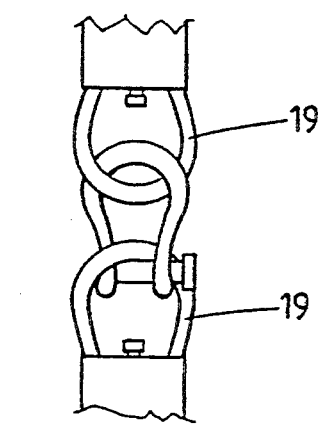
FIG 7
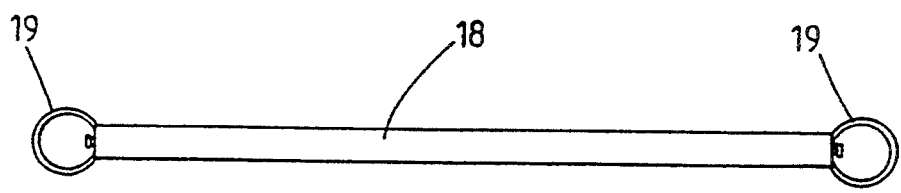
FIG 6

SUSPENDING LOADS FROM A HELICOPTER

BACKGROUND OF THE INVENTION

This invention relates to improvements to suspending loads from a rotary wing aircraft (preferably a helicopter) for applications such as placing a human upon an electric transmission line, or transmission line tower, wherein the transmission line may be either energised (live) or de-energised (dead).

Constructing, maintaining and repairing electric transmission line systems are done either in an energised or de-energised state. When repairing or maintaining such systems it is generally uneconomical to de-energise the system. Hence, it is preferred that maintenance or repair be carried out upon energised conductors, Where this is not possible maintenance and repairs are required to be done as quickly as possible so that loss of revenue and possible inconvenience to users is minimised.

One approach to repair and maintenance has been that of humans climbing the large transmission system towers to access conductors, insulators, and the various pars of the towers themselves. This is a time consuming and inefficient approach in which vast amounts of revenue may be lost in cases when the lines have to be de-energised for safety reasons.

Another approach is that of using both insulated and non-insulated vehicles or towers in which when working upon energised lines such equipment must be insulated. Nevertheless, there is still a potential for fault discharges due to structural defaults or negligence of personnel which can cause damage to equipment and more seriously death to personnel. Another disadvantage is that this equipment is not suited to rugged terrain and its transportation speed is relatively slow. Consequently, when considering Australian transmission line distances and terrain, repair and maintenance may be time consuming and impractical using this approach.

Another approach is that of carrying personnel and equipment upon a helicopter wherein a human sits on a rigid platform attached to the helicopter. The helicopter manoeuvres close to a desired area (the area being either energised or de-energised) and the worker then carries out maintenance, repair, or installation whilst being supported by the helicopter. It is possible for humans to work on energised conductors using this approach as both the human and helicopter are ungrounded and therefore in an ideal situation there is no danger of damage or death. Unfortunately, this is a relatively expensive approach as there is required at least a helicopter pilot, a service and maintenance engineer, and a helicopter which must be in operation throughout the maintenance or service operation. In addition, there is a danger that the helicopter's rotor blades may cause a short between two conductors or may hit part of the transmission system which may just damage the system or could snap a rotor blade causing death to the pilot and engineer.

Another more suitable approach has been developed and published in U.S. Pat. No. 4,673,059 in which a maintenance engineer is suspended from an ungrounded support means such as a helicopter. The engineer may be suspended from a suspension means of insulated components so that the probability of shorting between conductors or a grounding discharge is further reduced. The suspension means is connected to a cargo hook attached to the helicopter and the engineer sits in a basket or seat device. There is a limited slip means to allow for a margin of error when the load (engineer) is simultaneously tethered to the helicopter and stationary component of the transmission line system. As an alternative to the limited slip device there is a common break-away link adapted to rupture when an instantaneous dynamic force of about 900 lbs is applied.

Unfortunately, the invention disclosed in U.S. Pat. No. 4,673,059 has problems associated with safety of suspended loads (especially when near live transmission lines). One such problem with the above arrangement is that in one embodiment the load is suspended from only a cargo hook in which there is no backup safety feature. Thus, the pilot may inadvertently or erroneously release the hook therefore endangering the engineer and other people.

SUMMARY OF THE INVENTION

It is the intended object of this invention to alleviate one or more of the above problems or at least provide the public with a useful alternative.

According to one form of this invention there is provided an arrangement for suspending a load from a rotary winged aircraft by two releasable means, wherein the load is adapted to be detached from the rotary winged aircraft upon both connections being released.

Alternatively, according to another form of this invention there is provided an arrangement for suspending a load from a rotary winged aircraft including:
- a releasable strap means extending around a secure part of said rotary winged aircraft; and
- a connection means connected to a releasable connection point on said rotary winged aircraft, said connection means being attached to or integral with said strap means and adapted to suspend a load from said rotary winged aircraft when it is airborne, wherein said arrangement is adapted to suspend a load until both said releasable strap means and said releasable connection point are released.

Alternatively, according to another form of this invention there is provided an arrangement for suspending a load from a rotary winged aircraft including:
- a releasable strap means extending around a secure part of said rotary winged aircraft; and
- a connection means connected to a releasable connection point on said rotary winged aircraft, said connection means having an aperture through which said strap means passes therethrough, the connection means being adapted to suspend a load from said rotary winged aircraft when it is airborne, wherein said arrangement is adapted to suspend a load until both said releasable strap means and said releasable connection point are released.

In preference, said releasable strap means is a strap having two ends connected together by a releasable connecting arrangement.

In case of an emergency said connection means is preferably adapted to be disconnected rapidly from said connection point.

Alternatively, according to another form of this invention there is provided an arrangement for suspending a load from a rotary winged aircraft including:
- a first releasable strap means and a second releasable strap means, both strap means extending around a secure part of said rotary winged aircraft; and a connection means attached to or integral with said first strap means, said first strap means being adapted to suspend a load from said rotary winged aircraft when it is airborne, and said second strap means passing through said connection means, wherein said arrangement is adapted to suspend a load until both releasable strap means are released.

In preference, both releasable strap means are straps, each having two ends connected together by a releasable connecting arrangement.

Alternatively, according to another form of this invention, there is provided an arrangement for suspending a load from a rotary winged aircraft including:

two releasable strap means extending around a secure part of said rotary winged aircraft; and a connection means arranged such that both releasable strap means pass through said connection means, said connection means being adapted to suspend a load from said rotary winged aircraft when it is airborne, wherein said arrangement is adapted to suspend a load until both releasable strap means are released.

In preference, both releasable strap means are straps, each having two ends connected together by a releasable connecting arrangement.

In preference the strap means, as described in any of the above forms, are adapted to disconnect rapidly said two ends from each other.

To reduce damage to said strap means, as described in any of the above forms, from chafing, wearing and curing, there is preferably a protective sleeve covering said strap means. Further, if the strap means enters the inside of said rotary winged aircraft, there is preferably provided a protective cover means covering a section of the strap means. This reduces the possibility of said strap means causing injury to a human inside the aircraft upon release of said connecting arrangement.

In any of the above forms there is preferably an elongate length of suspension means between said load and said connection means or strap means. Therefore the rotary winged aircraft can manoeuvre and position the said load close to a transmission system whilst being in a position clear of the transmission system.

A preferable safety feature, in any of the above forms, is that of including an extension means within the said suspension means, said extension means being adapted to extend the length of the said suspension means when a force greater than a pro-determine value is applied to said suspension means.

In a further preferred form, of any of the above forms, said extension means is adapted to emit a loud noise and/or a flag upon extending the length of said suspension means. This offers a further safety feature in which the said noise and/or flag can warn personnel of a possible problem.

When working with or near energised transmission line systems there is a danger of grounding or shorting due to the suspension means being conductive. Therefore in a preferred form of any of the above forms, said suspension means includes at least one non-conductive length.

In a further preferred form, of any of the above forms, said load is a human located within a bosun chair at the bottom or said suspension means, said bosun chair having a suspension means attachment device and a transmission system attachment device, said suspension means attachment device being adapted to be detached from said suspension means upon said transmission system attachment device being attached to said transmission system such that said load is suspended from said transmission system.

For purposes such as an emergency whilst the suspension means is both tethered to the said rotary winged aircraft and a transmission line system there is preferably, in any one of the above forms, an emergency release mechanism included within said suspension means including a quick release mechanism adapted to be activated by a human load.

In a preferred form, of any of the above forms, said rotary winged aircraft is a helicopter.

In a preferred form, of any of the above forms, said at least two strap means, extending from said connection means is a bellyband.

In any one of the above forms, the load preferably has a conductive wand extending therefrom and adapted to touch said transmission line before said load contacts the transmission line system. This ensures said load is at the same potential as the transmission line system before actual load contact occurs.

Alternatively, according to another form of this invention, there is provided a method for transferring a load onto a transmission line system using an arrangement as described in any one or more of the above forms of the invention combined; the method including the steps of;

suspending said load above the ground from said arrangement;

positioning said load to effect attachment of said transmission system attachment device to said transmission line system;

attaching said transmission system attachment device to said transmission line system;

suspending or supporting said load from said transmission line system; and detaching said attachment device from said suspension means.

In preference, the method is further characterised by said transmission line system being energised above ground potential.

In preference, the method is further characterised by said load being a human wearing protective clothing, In preference, the method is further characterised by said human wearing a safety harness to effect an escape means from said transmission line system.

In preference, the method is further characterised by said suspending of said load is such that said load is same potential as that of the transmission line.

BRIEF DESCRIPTION OF THE DRAWINGS

For a better understanding of this invention a preferred embodiment will now be described with the assistance of drawings in which:

FIG. 2 is a cross sectional view of the helicopter illustrating the function of the strap means or bellyband, FIG. 3 is a cross sectional view of the helicopter illustrating the function of the strap means when the helicopter does not have a hook, FIG. 4 illustrates the strap means known as a bellyband, FIG. 5 illustrates two shock arresters one of which is adapted for transporting a load onto conductor or structure rigging the other for structure rigging, FIG. 6 illustrates a suspension insulator, FIG. 7 illustrates shackle adapted to connect suspension insulators together.

DESCRIPTION OF THE PREFERRED EMBODIMENT

Figure 1:
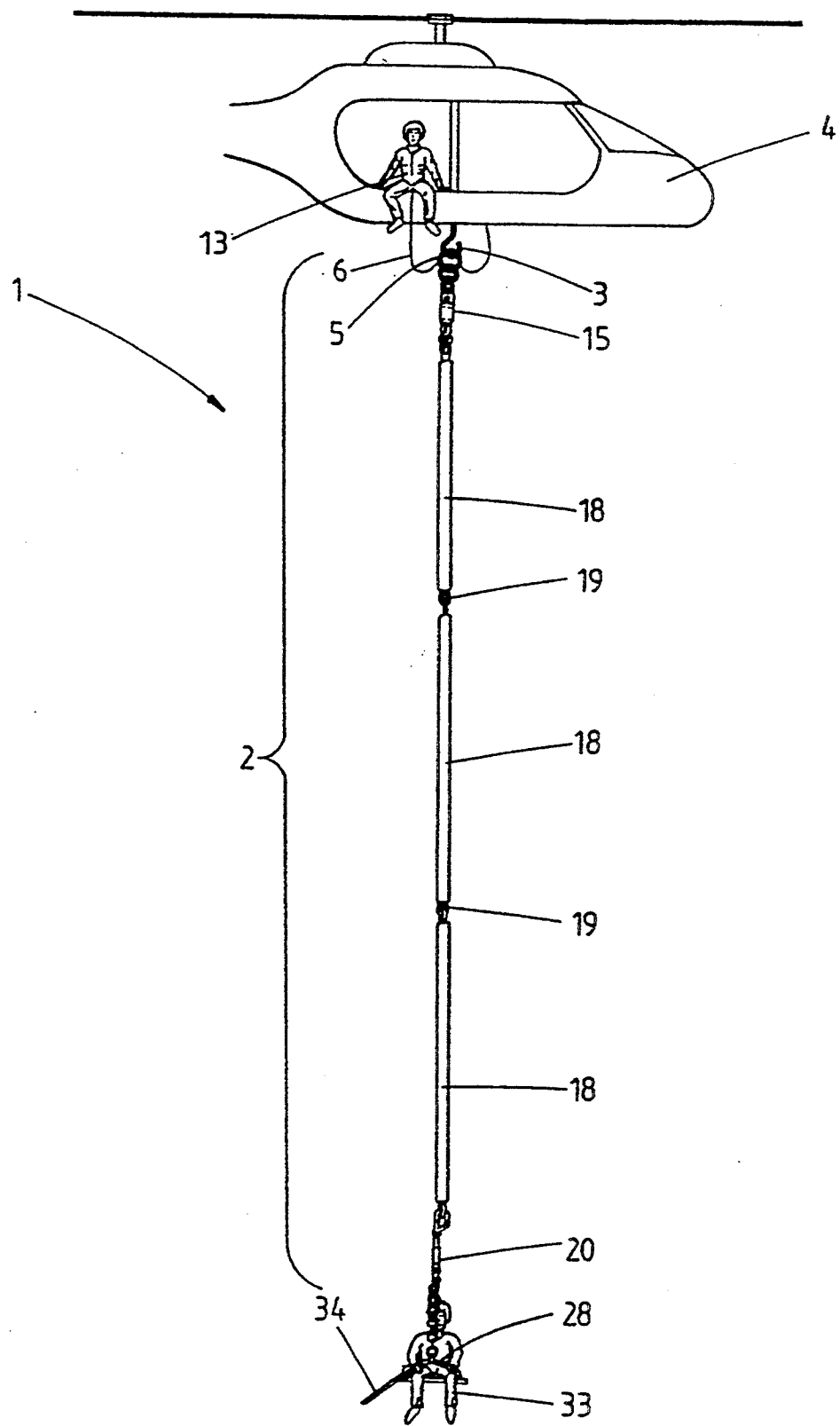
FIG. 1 illustrates the invention in which a human load is suspended from the helicopter by insulators.

Referring to FIGS. 1 to 10 there is illustrated a means of transporting 1 a load onto or adjacent to components of a transmission line system. The means of transporting 1 has an arrangement of components providing a safety suspension means suspended from a hook 3 located on the underside of a helicopter 4. The hook 3 supports the suspension means 2 from a ring 5 of the strap means known as the bellyband 6. For improved safety the arms 7 and 8 of the bellyband 6 are connected within the helicopter 4 by the ring 9 and attachment means 10 as illustrated in FIG. 2. In addition to improve safety and wear and tear on the bellyband 6 anti-chafing devices 11 and 12 may be used so that the sharp edges and corners of the helicopter 4 do not damage the bellyband's arms 7 and 8.

The bellyband arrangement is primarily for safety purposes in which if the pilot releases the suspension means 2 suspended from the bellyband's ring 5, attached to the hook 3, then the bellyband arrangement connected within the helicopter 4, by attachment means 10 and ring 9 (refer to FIG. 2), will suspend the suspension means 2. Only when the ring 5 is released from the hook 3 and a crew member 13 (who normally lies down across the helicopter 4 to improve downward observation) disconnects the attachment means 10 from the ring 9 (by a quick release mechanism 14) will the suspension means 2 detach completely from the helicopter 4. This is a safety feature requiring both pilot and a crew member 13 to activate a release mechanism before the suspension means 2 will be detached from the helicopter 4.

In cases where helicopters do not have a hook 3 an additional strap (lanyard) can be looped through the bellybands ring 5 and connected via an attachment means 10 and ring 9 arrangement within the helicopter 4 (as shown in FIG. 3). This offers an additional safety feature when the hook 3 is not available and requires that the crew member 13 releases both attachment means 10 from the rings 9 before the suspension means 2 can be detached from the helicopter 4.

The shock arrester 15 is adapted to provide a quick reacting device for extending the suspension means 2, whereby when the suspension means 2 is simultaneously attached to a transmission line system (such as a tower or conductor) and helicopter 4 then it can automatically extend to a limited length. Referring to FIG. 5 there is illustrated two shock arresters 15 one of which is for use on conductor or structure rigging and the other is for use on tower rigging. The latter arrester has line in a bag 16 adapted to extend the support means 2 in a case of an emergency. The conductor rigging or structure shock arrester 15 does not require the bag 16 (conductors are less rigid than towers) and therefore only a small length of webbing is used as an extension means. The webbing is stored within a stitched pouch 17 and when a sufficient force is applied to the suspension means 2 the pouch 17 will rip and therefore increase tile length of the support means 2. An additional feature of the conductor rigging shock arrester 15 is that upon the pouch 17 ripping a loud noise will be produced and/or a red flag indicator will preferably be displayed. This warns the flight member 13 and human load 33 of a possible dangerous situation.

FIG. 6 shows a typical insulator 18 used in the suspension means 2 in which at each end there are connecting loops 19. These loops 19 can be adapted to swivel at the ends of the insulator 18 therefore allowing a degree of manoeuvrability (note the insulators are usually, but not necessarily, rigid), The loops 19 are connected together by a standard shackle or fastener as illustrated in FIG. 7.

Figure 8:
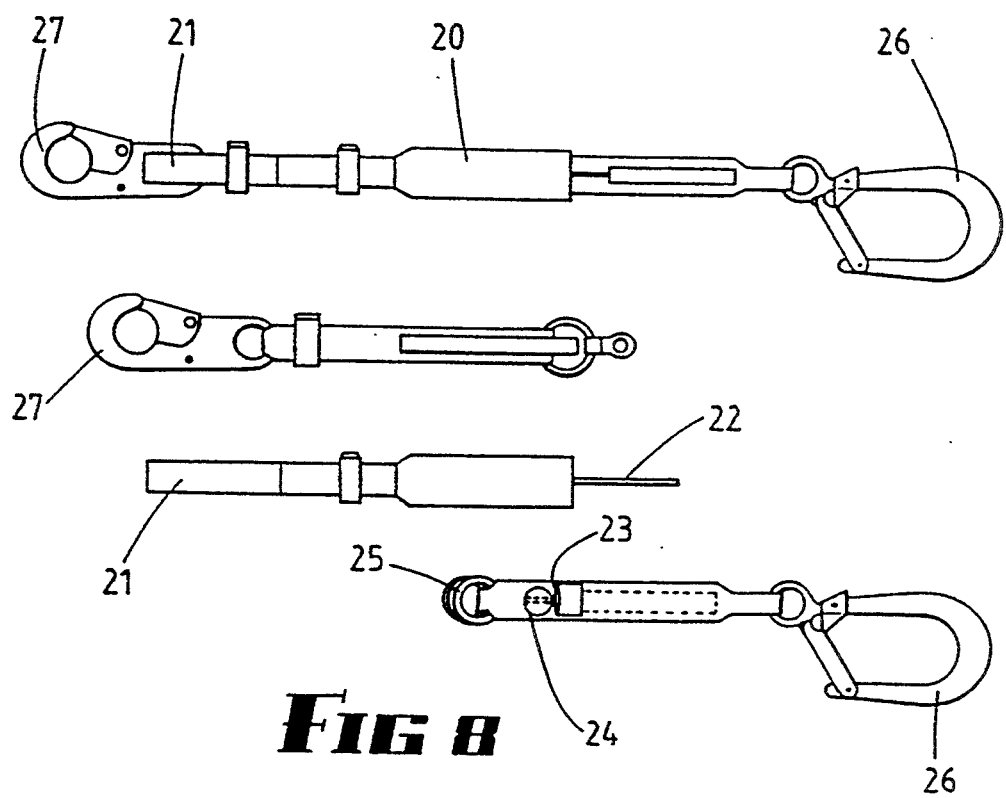
FIG. 8 illustrates a mechanical release mechanism.
Figure 9:
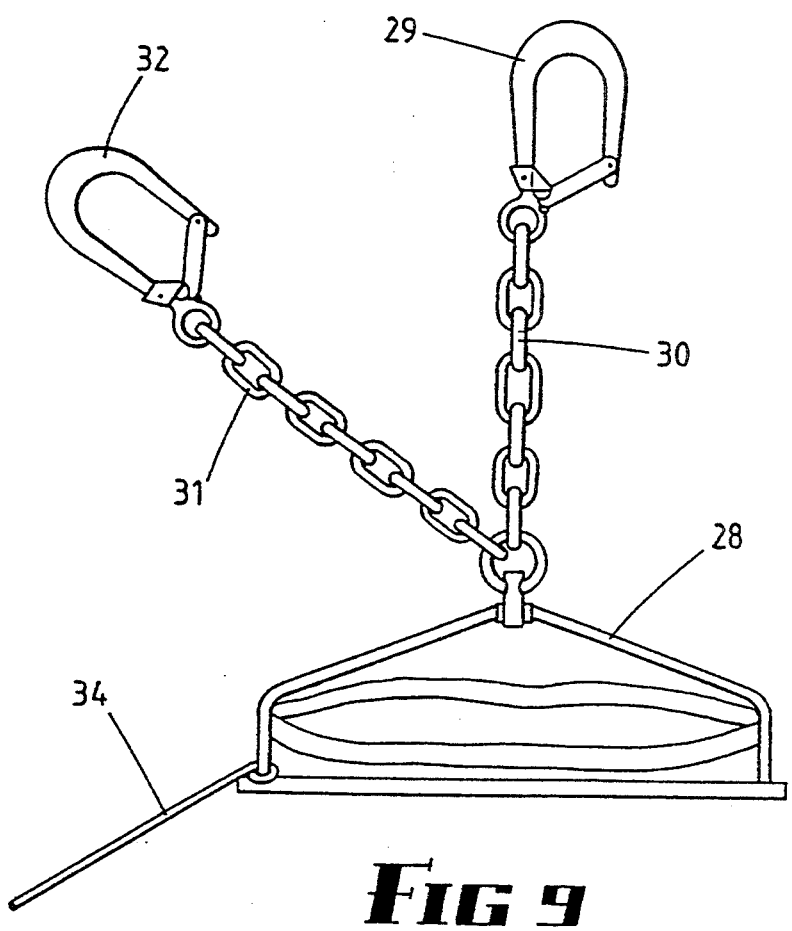
FIG. 9 illustrates a bosun chair.

Preferably, at the lower end of the suspension means 2 there is a mechanical release 20 (illustrated in FIG. 8). When the load 33 is a human the mechanical release 20 acts as an additional safety feature. In the event of an emergency whilst the suspension means 2 is both tethered to the helicopter 4 and a transmission system the human load 33 can pull the tab 21 and separate from the suspension means 2. The mechanical release 20 is designed in a similar fashion to that of a parachute release. It consists of a stiff, plastic coated wire 22 that runs through a loop of parachute cord 23. The parachute cord is run through a metal grommet 24 to the back of a lanyard (strapping). The cord holds the top of the three rings 25 that are interlocked to reduce the weight held by any one ring. By pulling the release tab 21 the wire is pulled through the cord. The loop of the cord can then pull back through the grommet and release the rings. The top of the lanyard stays with the suspension means 2 and the bottom stays with the load 33. The snaps of the mechanical release 20 are double locking for additional safety.

The attachment means 26 of the mechanical release 20 is attached to a loop 19 of the bottom most insulator 18. The other attachment means 27 of the mechanical release 20 is attached to a bosun chair 28 in which the load 33 is placed. The bosun chair 28 is attached to the mechanical release's attachment means 27 by the bosun chair attachment means 29. The bosun chair 28 has two lengths of chain 30 and 31 one of which is connected to the attachment means 29 and therefore connected to the support means 2 whereas the second chain 31 is used to attach the bosun chair 28 to the transmission line system by the connection means 32. An additional feature that may be included in the bosun chair arrangement is the conductive wand 34 the function of which is described below, On connection of the connection means 32 to the transmission line system the helicopter 4 lowers the load 33 so that the weight of the load 33 is transferred to the attachment means 32 and therefore the attachment means 29 can be removed from the suspension means 2 and the helicopter 4 can therefore fly away for refuelling or picking up further loads (which may be either human loads or inanimate loads such as equipment or materials).

To collect a load (human) 33 from a transmission line system the reverse of the above is required in which the load 33 connects the attachment means 29 to the suspension means 2. The helicopter then lifts the load 33 until the load is no longer suspended from the attachment means The attachment means 32 is thus removed from the transmission line system and the load 33 can be transported to another location.

Figure 10:
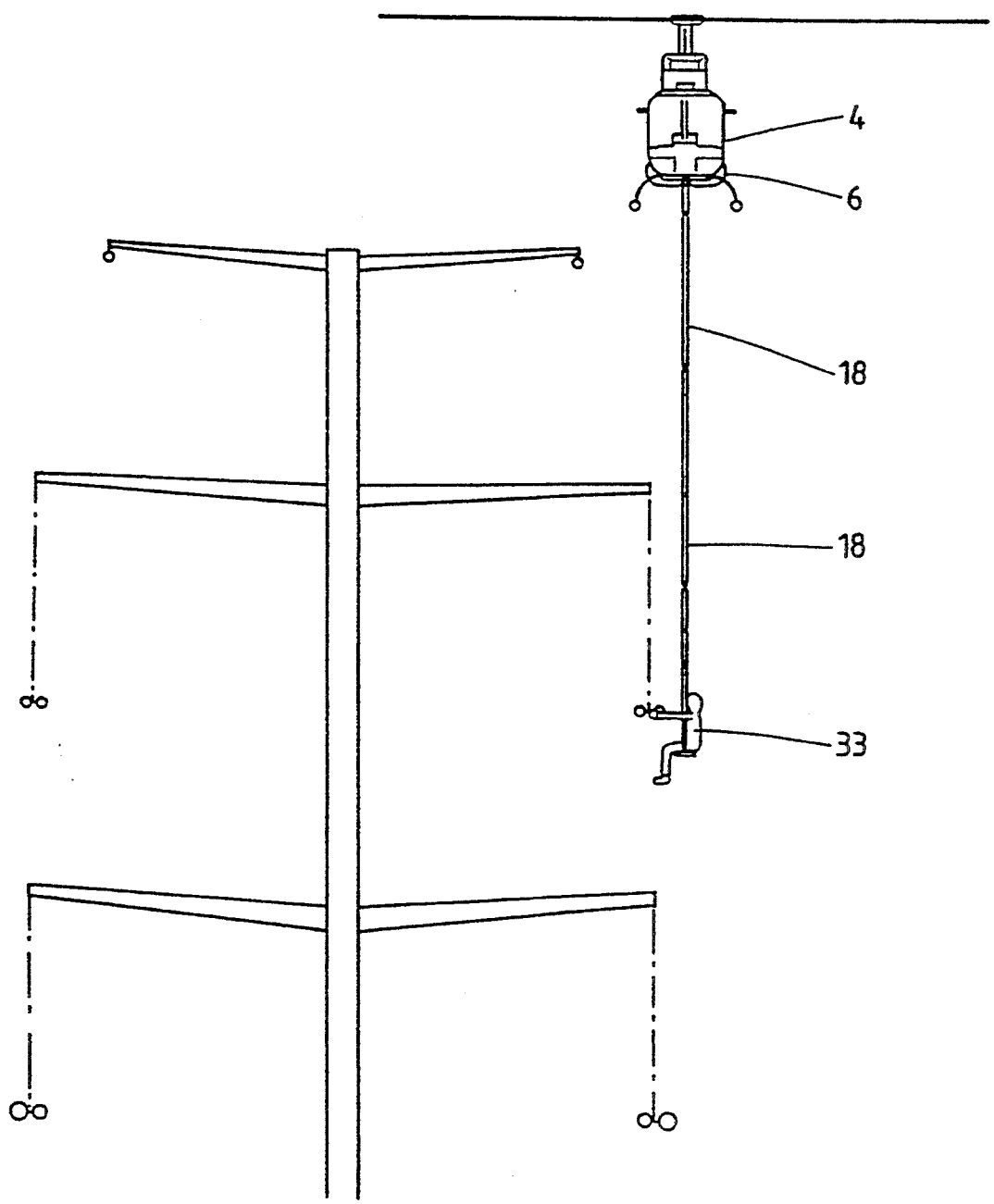
FIG. 10 is an illustration of a typical application.

Referring to FIG. 10 there is illustrated a typical application in which a human load 33 is about to be attached to a transmission line. In this example the insulators 18 have sufficient insulation and length such that the probability of grounding or shorting is minimised.

For additional safety a human load 33 wears standard harness so that in the case of an emergency the load 33 can attach the harness to the transmission line system and lower himself to the ground. The human load 33 should wear protective clothing, when working upon energised systems, including: a conductive suit; conductive gloves; a helmet with a conductive cover; a full face visor; and safety glasses for protection against arcing. Further, it is advisable for the human load to use the conductive wand 34 so that he is at the same potential before he touches the transmission line system. Once the human load 33 is in contact with the transmission line system, a "pull off" continuous conductor can be used which is connected to both the human load 33 and energised transmission line so that an equal potential is maintained.

Note in the above preferred embodiment can be modified so that a sling can be attached between the bellyband's ring 9 and shock arrester 15 therefore allowing more flexibility and versatility to the suspension means 2. In addition, if work is being undertaken upon a de-energised transmission line system the insulators 18 can be replaced by a standard sling. If the load is not a human than the bosun chair and mechanical release 20 can be removed and replaced by a standard load carrying harness.

I claim:

1. An arrangement for suspending a load from a rotary winged aircraft including:
   a first releasable strap means and a second releasable strap means, both Strap means extending around a secure pad of said rotary winged aircraft; and
   a connection means attached to or integral with said first strap means, said first strap means being adapted to suspend a load from said rotary winged aircraft when it is airborne, and said second strap means passing through said connection means, wherein said arrangement is adapted to suspend a load until both releasable strap means are released.

2. An arrangement for suspending a load from a rotary winged aircraft as in claim 1 in which both releasable strap means are straps, each having two ends connected together by a releasable connecting arrangement.

3. An arrangement for suspending a lead from a rotary winged aircraft as in claim 2 in which there is an elongate length of suspension means between said lead and said connection means or strap means.

4. An arrangement for suspending a load from a rotary winged aircraft as in claim 3 in which there is an extension means within said suspension means or strap means, said extension means being adapted to extend the length of the said suspension means when a greater than a pro-determine value is applied to said suspension means.

5. An arrangement for suspending a load from a rotary winged aircraft as in claim 4 in which said extension means is adapted to provide a warning signal upon extending the length of said suspension means.

6. An arrangement for suspending a load from a rotary winged aircraft as in claim 4 in which said suspension means includes at least one non-conductive length and said load is a human located within a bosun chair at the bottom of said suspension means, said bosun chair having a suspension means attachment device and a transmission system attachment device, said suspension means attachment device being adapted to be detached from said suspension means upon said transmission system attachment device being attached to said transmission system such that said lead is suspended from said transmission system.

7. An arrangement for suspending a lead from a rotary winged aircraft as in claim 4 in which an emergency release mechanism included within said suspension means includes s quick release mechanism adapted to be activated by a human lead.

8. An arrangement for suspending a load from a rotary winged aircraft including:
   two releasable strap means extending around a secure part of said rotary winged aircraft; and
   a connection means arranged such that both releasable strap means pass through said connection means, said connection means being adapted to suspend a load from said rotary winged aircraft when it is airborne, wherein said arrangement is adapted to suspend a load until both releasable strap means are released.

9. An arrangement for suspending a load from a rotary winged aircraft as in claim 8 in which the releasable strap means are straps, each having two ends connected together by a releasable connecting arrangement.

10. An arrangement for suspending a load from a rotary winged aircraft as in claim 9 in which the strap means are adapted to disconnect rapidly said two ends from each other.

11. An arrangement for suspending a load from a rotary winged aircraft as in claim 8 in which there is a protective sleeve covering both said strap means.

12. An arrangement for suspending a lead from a rotary winged aircraft as in claim 11 in which there is an extension means within said suspension means, said extension means being adapted to extend the length of the said suspension means when a force greater than a pro-determine value is applied to said suspension means.

* * * * *